US011891094B2

(12) United States Patent
Guizilini et al.

(10) Patent No.: US 11,891,094 B2
(45) Date of Patent: Feb. 6, 2024

(54) USING A NEURAL NETWORK TO PRODUCE A DIGITAL MAP FOR A LOCATION

(71) Applicant: Toyota Research Institute, Inc., Los Altos, CA (US)

(72) Inventors: Vitor Guizilini, Santa Clara, CA (US); Rares A. Ambrus, San Francisco, CA (US); Sudeep Pillai, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 690 days.

(21) Appl. No.: 16/897,830

(22) Filed: Jun. 10, 2020

(65) Prior Publication Data

US 2021/0387648 A1 Dec. 16, 2021

(51) Int. Cl.
*B60W 60/00* (2020.01)
*G01C 21/30* (2006.01)
*G01C 21/34* (2006.01)
*G01C 21/36* (2006.01)
*G01S 19/42* (2010.01)
*G06F 16/29* (2019.01)
*G08G 1/0969* (2006.01)
(Continued)

(52) U.S. Cl.
CPC ......... *B60W 60/0025* (2020.02); *G01C 21/30* (2013.01); *G01C 21/3407* (2013.01); *G01C 21/3638* (2013.01); *G01S 19/42* (2013.01); *G06F 16/29* (2019.01); *G06N 3/04* (2013.01); *G06N 3/08* (2013.01); *G08G 1/0969* (2013.01)

(58) Field of Classification Search
None
See application file for complete search history.

(56) References Cited

U.S. PATENT DOCUMENTS 10,239,521 B1 * 3/2019 Xiao ................... G06V 20/586
2011/0238297 A1 6/2011 Severson
(Continued)

OTHER PUBLICATIONS

Ghafoorian et al., "EL-GAN: Embedding Loss Driven Generative Adversarial Networks for Lane Detection," found at https://arxiv.org/abs/1806.05525, last revised Jul. 5, 2018.
(Continued)

*Primary Examiner* — Aniss Chad
*Assistant Examiner* — Mahmoud M Kazimi
(74) *Attorney, Agent, or Firm* — Christopher G. Darrow; Darrow Mustafa PC

(57) ABSTRACT

Information that identifies a location can be received. In response to a receipt of the information that identifies the location, a file can be retrieved. The file can be for the location. The file can include image data and a set of node data. The set of node data can include information that identifies nodes in a neural network, information that identifies inputs of the nodes, and values of weights to be applied to the inputs. In response to a retrieval of the file, the weights can be applied to the inputs of the nodes and the image data can be received for the neural network. In response to an application of the weights and a receipt of the image data, the neural network can be executed to produce a digital map for the location. The digital map for the location can be transmitted to an automotive navigation system.

21 Claims, 7 Drawing Sheets

(51) Int. Cl.
  *G06N 3/08*    (2023.01)
  *G06N 3/04*    (2023.01)

(56) References Cited

U.S. PATENT DOCUMENTS

| | | |
|---|---|---|
| 2016/0267331 A1 | 9/2016 | Pillai et al. |
| 2018/0174051 A1* | 6/2018 | Knittel ................... G06N 3/084 |
| 2019/0369643 A1* | 12/2019 | Jeon .................. B60W 60/0053 |
| 2019/0383945 A1* | 12/2019 | Wang ....................... G01S 17/42 |
| 2020/0134833 A1* | 4/2020 | Biswas .................. G06N 5/046 |

OTHER PUBLICATIONS

Shi et al., "Self-Supervised Learning of Depth and Ego-motion with Differentiable Bundle Adjustment," found at https://arxiv.org/abs/1909.13163, Sep. 28, 2019.

Sun et al., "Affordance Learning In Direct Perception for Autonomous Driving," found at https://arxiv.org/abs/1903.08746, Mar. 20, 2019.

Griffiths et al., "A Review on Deep Learning Techniques for 3D Sensed Data Classification," found at https://arxiv.org/abs/1907.04444, and submitted Jul. 9, 2019.

Liang et al., "LineNet: a Zoomable CNN for Crowdsourced High Definition Maps Modeling in Urban Environments," found at https://arxiv.org/abs/1807.05696, Jul. 16, 2018.

Kumar Chellapilla "Rethinking Maps for Self-Driving," found at https://medium.com/lyftlevel5/https-medium-com-lyftlevel5-rethinking-maps-for-self-driving-a147c24758d6, Oct. 18, 2015, 11 pages.

* cited by examiner

| NODES | INPUTS | WEIGHTS |
|---|---|---|
| 302 | 302-1 | $W_1$ |
| 302 | 302-2 | $W_2$ |
| 304 | 304-1 | $W_3$ |
| 304 | 304-2 | $W_4$ |
| 312 | 312-1 | $W_5$ |
| 312 | 312-2 | $W_6$ |
| 314 | 314-1 | $W_7$ |
| 314 | 314-2 | $W_8$ |
| 320 | 320-1 | $W_9$ |
| 320 | 320-2 | $W_{10}$ |

USING A NEURAL NETWORK TO PRODUCE A DIGITAL MAP FOR A LOCATION

TECHNICAL FIELD

The disclosed technologies are directed to using a neural network to produce a digital map for a location. Specifically, the disclosed technologies are directed to using a neural network to account for various problems associated with a production of a three dimensional image included in the digital map.

BACKGROUND

A digital map can be an electronic representation of a conventional paper road map. If information for a digital map is communicated from a server via the World Wide Web, then the digital map can be referred to as a web map. An automotive navigation system can use information received from a digital map and information received from a global navigation satellite system (GNNS) to produce a turn-by-turn navigation service. A turn-by-turn navigation service can provide a route between an origination point and a destination point. A position of a vehicle determined by a turn-by-turn navigation service can be within a meter of an actual position.

Although such a degree of accuracy can be acceptable for a vehicle operated by a human being, an operation of an autonomous vehicle can require a degree of accuracy that is within a decimeter. Accordingly, efforts to develop autonomous vehicles have been accompanied by efforts to improve the degree of accuracy of digital maps. Such efforts have led to the production of high definition maps.

A high definition map can be a digital map that includes additional information to improve the degree of accuracy to that required for an autonomous vehicle. A high definition map can be characterized as having layers of additional information. Each layer of additional information can be associated with a specific category of additional information. These layers can include, for example, a base map layer, a geometric map layer, a semantic map layer, a map priors layer, and a real-time knowledge layer. The base map layer, the geometric map layer, and the semantic map layer can include information about static aspects of a location. The map priors layer and the real-time knowledge layer can include information about dynamic aspects of the location.

The base map layer can include the information received from the digital map and the information received from the global navigation satellite system (GNNS) that produced the turn-by-turn navigation service.

The geometric map layer can be produced, using a simultaneous localization and mapping (SLAM) algorithm, by combining position information with one or more three dimensional images. The position information can be received from one or more of a global navigation satellite system (GNNS), an inertial measurement unit (IMU), or the like. The one or more three dimensional images can be one or more of point cloud information (e.g. produced by a light detection and ranging (LIDAR) system), pixel information from one or more images (e.g., produced by one or more image sensors or cameras), or the like. The geometric map layer can include a ground map, of driveable surfaces, and voxelized geometric maps of three dimensional objects at the location.

The semantic map layer can include information about semantic objects included at the location. Semantic objects can include, for example, lane boundaries, intersections, crosswalks, parking spots, stop signs, traffic lights, or the like. The semantic map layer can include bounding boxes around the semantic objects.

The maps priors layer can include historic dynamic information related to the location. The historic dynamic information can include, for example, an order of a cycle of states of a traffic light (e.g., (1) protected-left, green, yellow, red; (2) green, protected-left, yellow, red; etc.); a duration of time of each of the states; a likelihood that, at a specific time, a vehicle will be parked in a specific lane; or the like.

The real-time knowledge layer can include real-time traffic information. The real-time traffic information can include, for example, information about an actual speed of traffic at the location, information about a construction zone at the location, or the like.

An automotive navigation system can control, via information provided in a high definition map, an operation of an autonomous vehicle.

Various problems can be associated with a production of the one or more three dimensional images for the geometric map layer. Such problems can include, for example, having a three dimensional image be from a viewpoint such that at least a portion of a first object is occluded by at least a portion of a second object; having a dynamic object (e.g., a parked vehicle, a pedestrian, etc.) included in a three dimensional image (which is intended to include only information about static aspects of the location); having a spatial deviation between an actual position of an object and an ostensible position of a representation of the object in the three dimensional image (e.g., inherent uncertainty due to a degree of accuracy of a sensor or a system that produced the three dimensional image); or the like.

SUMMARY

In an embodiment, a system for producing a digital map for a location can include one or more processors, a data store, and a memory. The one or more processors can be communicably coupled to the data store and to the memory. The one or more processors can be configured to receive information that identifies a location. The data store can store a file. The file can be for the location. The file can include a set of image data and a set of node data. The set of node data can include information that identifies nodes in a neural network, information that identifies inputs of the nodes, and values of weights to be applied to the inputs. The memory can store an initiation module, a neural network module, and a communications module. The initiation module can include instructions that when executed by the one or more processors cause, in response to a retrieval of the file, the one or more processors to apply the weights to the inputs of the nodes and to receive the image data for the neural network. The neural network module can include instructions that when executed by the one or more processors cause the one or more processors to execute, in response to an application of the weights and a receipt of the image data, the neural network to produce the digital map for the location. The communications module can include instructions that when executed by the one or more processors cause the one or more processors to transmit the digital map for the location to an automotive navigation system.

In another embodiment, a method for producing a digital map for a location can include receiving, by a processor, information that identifies a location. The method can include retrieving, by the processor and in response to a receipt of the information that identifies the location, a file. The file can be for the location. The file can include a set of image data and a set of node data. The set of node data can include information that identifies nodes in a neural network, information that identifies inputs of the nodes, and values of weights to be applied to the inputs. The method can include applying, by the processor and in response to a retrieval of the file, the weights to the inputs of the nodes. The method can include receiving, by the processor and in response to the retrieval of the file, the image data for the neural network. The method can include executing, by the processor and in response to an application of the weights and a receipt of the image data, the neural network to produce the digital map for the location. The method can include transmitting, by the processor, the digital map for the location to an automotive navigation system.

In another embodiment, a non-transitory computer-readable medium for producing a digital map for a location can include instructions that when executed by one or more processors cause the one or more processors to receive information that identifies the location. The non-transitory computer-readable medium can include instructions that when executed by one or more processors cause the one or more processors to retrieve, in response to a receipt of the information that identifies the location, a file. The file can be for the location. The file can include a set of image data and a set of node data. The set of node data can include information that identifies nodes in a neural network, information that identifies inputs of the nodes, and values of weights to be applied to the inputs. The non-transitory computer-readable medium can include instructions that when executed by one or more processors cause the one or more processors to apply, in response to a retrieval of the file, the weights to the inputs of the nodes. The non-transitory computer-readable medium can include instructions that when executed by one or more processors cause the one or more processors to receive, in response to the retrieval of the file, the image data for the neural network. The non-transitory computer-readable medium can include instructions that when executed by one or more processors cause the one or more processors to execute, in response to an application of the weights and a receipt of the image data, the neural network to produce the digital map for the location. The non-transitory computer-readable medium can include instructions that when executed by one or more processors cause the one or more processors to transmit the digital map for the location to an automotive navigation system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A neural network can be a computing system configured to perform a task using an approach modeled upon a manner in which a brain processes information through neurons. An artificial neuron, also referred to as a node, can be a basic element of the neural network. The node can be configured to receive one or more inputs and to produce an output of a function. Each of the one or more inputs can be multiplied by a value of a weight to produce a weighted input. A sum of weighted inputs can be an argument of the function of the node. In the field of computer vision, a neural network can be an effective tool for using a depth model and a pose model to perform the task of producing a three dimensional image from one or more two dimensional images. The disclosed technologies are directed to using a neural network to produce, for a location, a digital map, which can include one or more three dimensional images produced from one or more two dimensional images.

Information that identifies a location can be received. In response to a receipt of the information that identifies the location, a file can be retrieved. The file can be for the location. The file can include a set of image data and a set of node data. The set of node data can include information that identifies nodes in a neural network, information that identifies inputs of the nodes, and values of weights to be applied to the inputs. In response to a retrieval of the file, the weights can be applied to the inputs of the nodes. In response to the retrieval of the file, the image data can be received for the neural network. In response to an application of the weights and a receipt of the set of image data, the neural network can be executed to produce a digital map for the location. The digital map for the location can be transmitted to an automotive navigation system.

Figure 1:
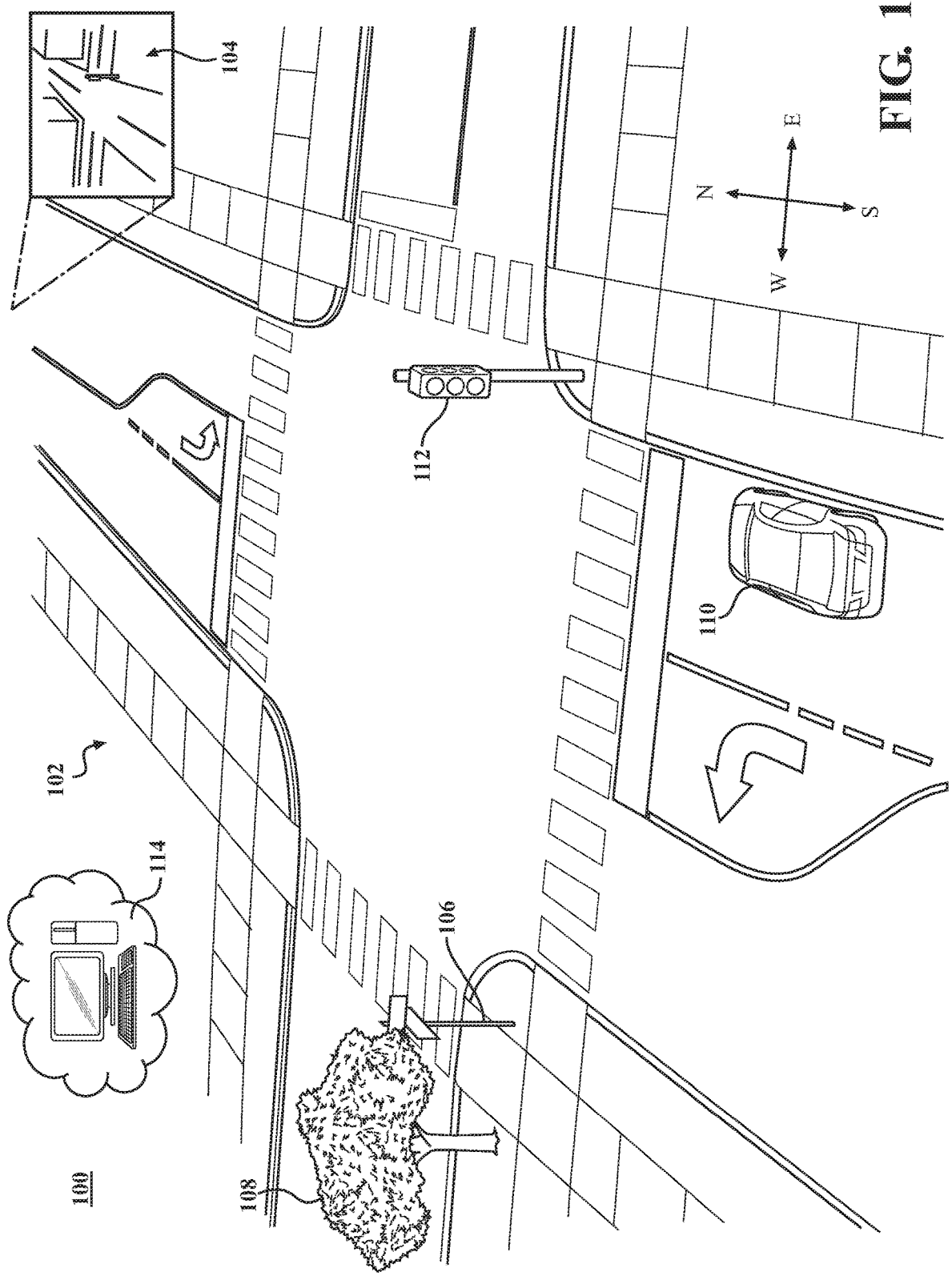
FIG. 1 is a diagram that illustrates an example of an environment for using a neural network to produce a digital map, according to the disclosed technologies.

FIG. 1 is a diagram that illustrates an example of an environment 100 for using a neural network to produce a digital map, according to the disclosed technologies. For example, the environment 100 can include a first location 102 and a second location 104. The first location 102 can be, for example, an intersection of First Street and Adams Avenue. The second location 104 can be, for example, an intersection of 50th Street and Zachary Avenue. The first location 102 can include, for example, a first object 106 (e.g., a street sign), a second object 108 (e.g., a tree), a third object 110 (e.g., a parked vehicle), and a fourth object 112 (e.g., a traffic light). Additionally, for example, the environment 100 can include a web map server 114 that can exchange communications with a vehicle.

Figure 2:
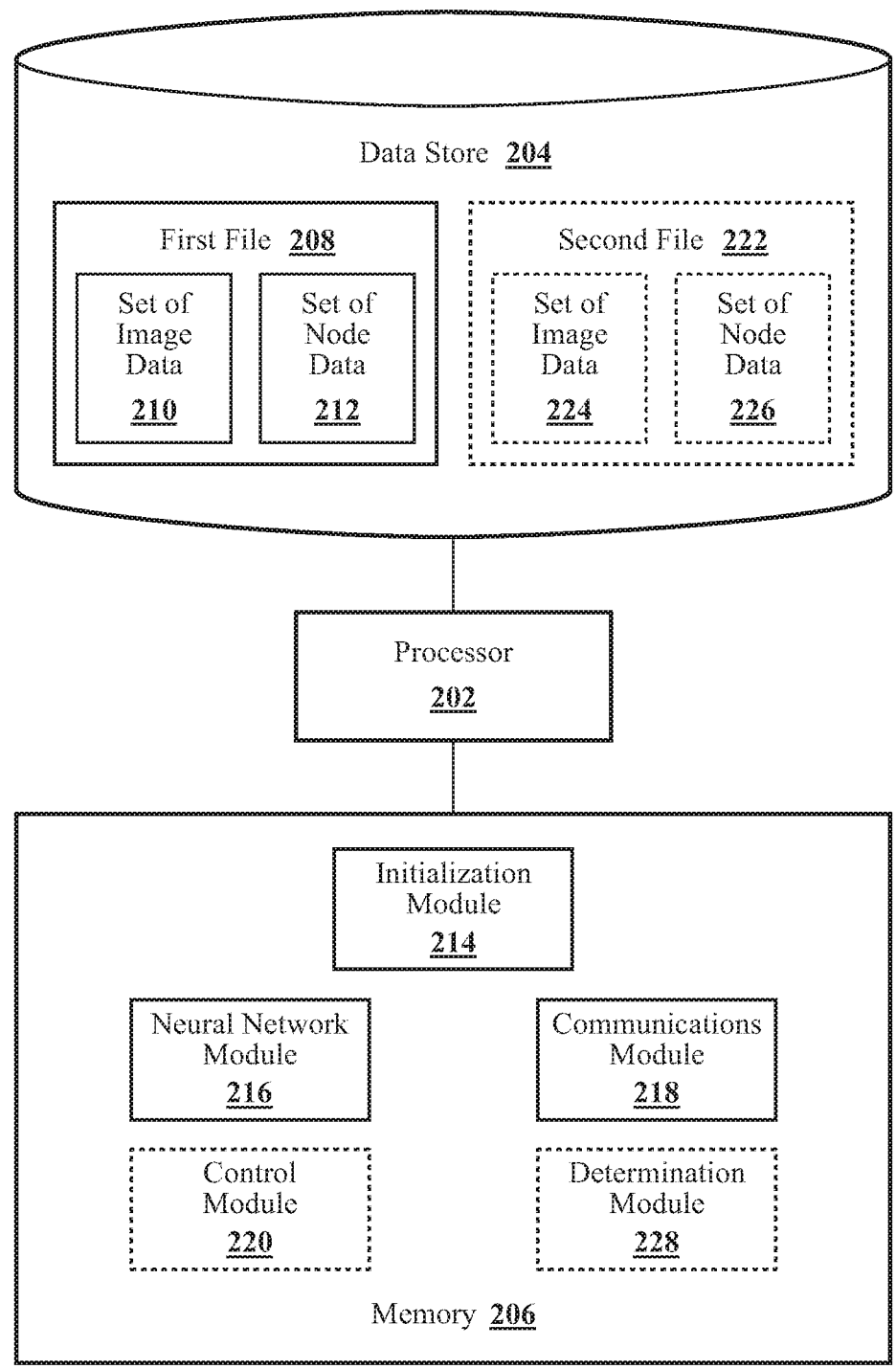
FIG. 2 is a block diagram that illustrates an example of a system for producing a digital map for a location, according to the disclosed technologies.

FIG. 2 is a block diagram that illustrates an example of a system 200 for producing a digital map for a location, according to the disclosed technologies. The system 200 can include, for example, a processor 202, a data store 204, and a memory 206. The processor 202 can be communicably coupled to the data store 204 and to the memory 206.

The processor 202 can be configured to receive, for example, information that identifies the first location 102

(illustrated in FIG. 1). In a first implementation, the system 200 can be disposed in a vehicle. In this implementation, the processor 202 can be configured to receive the information that identifies the first location 102 from a first system that is separate from the vehicle. The first system that is separate from the vehicle can be, for example, a global navigation satellite system (GNNS). In a second implementation, the system 200 can be disposed in a second system that is separate from the vehicle. The second system that is separate from the vehicle can be, for example, the web map server 114 (illustrated in FIG. 1). In this implementation, the processor 202 can be configured to receive the information that identifies the first location 102 from the vehicle.

The data store 204 can store, for example, a first file 208. The first file 208 can be for the first location 102. The first file 208 can include a set of image data 210 and a set of node data 212. For example, the set of image data 210 can include point cloud information (e.g. produced by a light detection and ranging (LIDAR) system). For example, the set of image data 210 can include pixel information from one or more images (e.g., produced by one or more image sensors or cameras). For example, the one or more images can be one or more two dimensional images. The set of node data 212 can include information that identifies nodes in a neural network, information that identifies inputs of the nodes, and values of weights to be applied to the inputs.

Figures 3, 4:
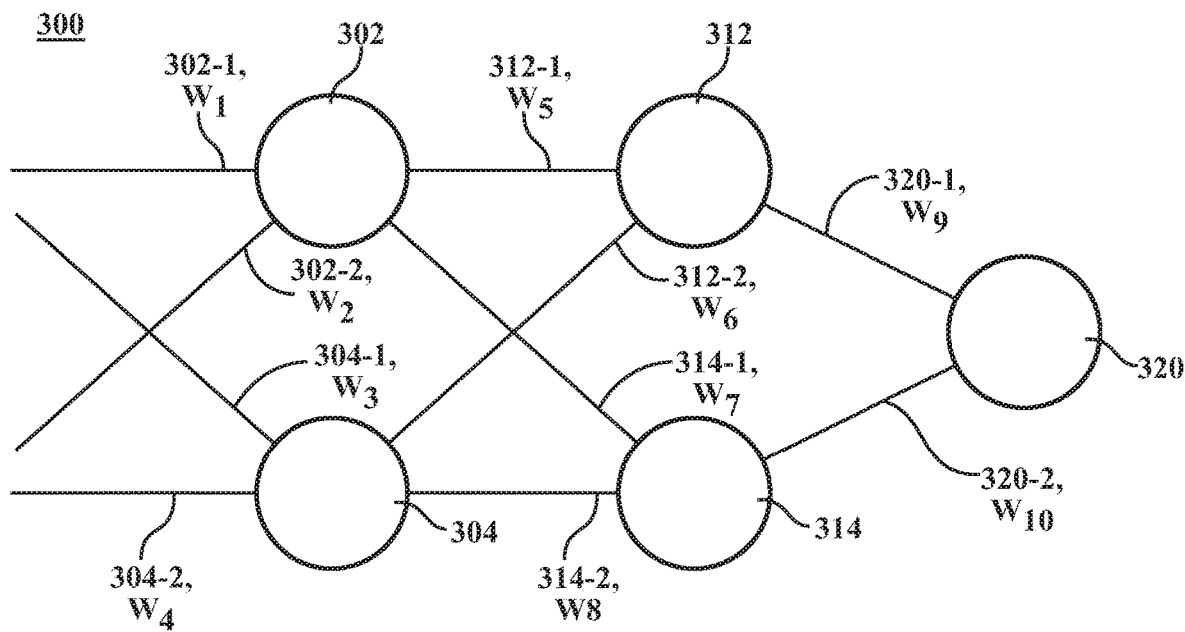
FIG. 3 is a block diagram that illustrates an example of a neural network.
FIG. 4 is a table of an example of a set of node data.

FIG. 3 is a block diagram that illustrates an example of a neural network 300. The neural network 300 can include, for example, a first node 302, a second node 304, a third node 312, a fourth node 314, and a fifth node 320. The first node 302 can have, for example, a first input 302-1 and a second input 302-2. A weight having a value of $W_1$ can be applied to the first input 302-1. A weight having a value of $W_2$ can be applied to the second input 302-2. The second node 304 can have, for example, a first input 304-1 and a second input 304-2. A weight having a value of $W_3$ can be applied to the first input 304-1. A weight having a value of $W_4$ can be applied to the second input 304-2. The third node 312 can have, for example, a first input 312-1 and a second input 312-2. A weight having a value of $W_5$ can be applied to the first input 312-1. A weight having a value of $W_6$ can be applied to the second input 312-2. The fourth node 314 can have, for example, a first input 314-1 and a second input 314-2. A weight having a value of $W_7$ can be applied to the first input 314-1. A weight having a value of $W_8$ can be applied to the second input 314-2. The fifth node 320 can have, for example, a first input 320-1 and a second input 320-2. A weight having a value of $W_9$ can be applied to the first input 320-1. A weight having a value of $W_{10}$ can be applied to the second input 320-2.

FIG. 4 is a table 400 of an example of a set of node data. The table 400 can include, for example, three columns and ten rows. The three columns can include, for example, the information that identifies the nodes 402 in the neural network 300, the information that identifies the inputs 404 of the nodes 402, and the values of weights 406 to be applied to the inputs 404.

Returning to FIG. 2, the memory 206 can store, for example, an initiation module 214, a neural network module 216, and a communications module 218.

For example, the initiation module 214 can include instructions that function to control the processor 202 to apply, in response to a retrieval of the first file 208, the weights to the inputs of the nodes and to receive the image data 210 for the neural network.

For example, the neural network module 216 can include instructions that function to control the processor 202 to execute, in response to an application of the weights and a receipt of the image data 210, the neural network to produce the digital map for the first location 102. For example, the digital map for the first location 102 can include a web map. For example, the digital map for the first location 102 can include a high definition map. For example, the digital map for the first location 102 can include a three dimensional image of the first location 102.

For example, the communications module 218 can include instructions that function to control the processor 202 to transmit the digital map for the first location 102 to an automotive navigation system. In the first implementation, in which the system 200 is disposed in a vehicle, the communications module 218 can include instructions that function to control the processor 202 to transmit, within the vehicle, the digital map for the first location 102 to the automotive navigation system of the vehicle. In the second implementation, in which the system 200 is disposed, for example, in the web map server 114 (illustrated in FIG. 1), the communications module 218 can include instructions that function to control the processor 202 to transmit, to a vehicle, the digital map for the first location 102 to the automotive navigation system of the vehicle.

In a variation of the first implementation or the second implementation, the vehicle can be an autonomous vehicle. In this variation, the memory 206 can further store a control module 220. For example, the control module 220 can include instructions that function to control the processor 202 to control, via the automotive navigation system and based on information included in the digital map for the first location 102, an operation of the autonomous vehicle.

Additionally, the data store 204 can further store a second file 222. The second file 222 can be for the second location 104. The second file 222 can include a set of image data 224 and a set of node data 226. The set of node data 226 can include the information that identifies the nodes in the neural network, the information that identifies the inputs of the nodes, and values of the weights to be applied to the inputs. At least one value of at least one weight of the weights of the set of node data 226 for the second location 104 can be different from at least one value of at least one weight of the weights of the set of node data 212 for the first location 102. For example, the intersection of 50th Street and Zachary Avenue, at the second location 104, can have been newly built. In this situation, the set of image data 224 may include pixel information from one or more images (e.g., produced by one or more image sensors or cameras), but may lack point cloud information (e.g. produced by a light detection and ranging (LIDAR) system). For example, such point cloud information can often be produced by a vehicle dedicated to a production of a high definition map and equipped with a LIDAR system. Such a vehicle may not yet have been to the second location 104. In such a situation, the weights for the inputs associated with processing point cloud information for the set of node data 226 can be different from the weights for the inputs associated with processing point cloud information for the set of node data 212.

In a first application, the neural network can account for having at least a portion of a first object be occluded by at least a portion of a second object in the image data 210. The digital map for the first location 102 can include a three dimensional image of the first location 102 (illustrated in FIG. 1). The three dimensional image of the first location 102 can be from a viewpoint. The image data 210 can include a representation of the first object (e.g., the first object 106 (e.g., the street sign)) and a representation of the second object (e.g., the second object 108 (e.g., the tree)).

The neural network module 216 can further include instructions that function to control the processor 202 to determine an existence, from the viewpoint, of an occlusion of at least a portion of the first object (e.g., the first object 106 (e.g., the street sign)) by at least a portion of the second object (e.g., the second object 108 (e.g., the tree)). The neural network module 216 can further include instructions that function to control the processor 202 to cause, in response to a determination of the existence of the occlusion, the at least the portion of the first object (e.g., the first object 106 (e.g., the street sign)) to appear in the three dimensional image free from the occlusion by the at least the portion of the second object (e.g., the second object 108 (e.g., the tree)).

In a second application, the neural network can account for having a dynamic object in the image data 210. The digital map for the first location 102 can include a three dimensional image of the first location 102 (illustrated in FIG. 1). The image data 210 can include a representation of an object (e.g., the third object 110 (e.g., the parked vehicle)). The neural network module 216 can further include instructions that function to control the processor 202 to determine that the object (e.g., the third object 110 (e.g., the parked vehicle)) is a dynamic object. The neural network module 216 can further include instructions that function to control the processor 202 to cause, in response to a determination that the object (e.g., the third object 110 (e.g., the parked vehicle)) is a dynamic object, the three dimensional image to exclude the object (e.g., the third object 110 (e.g., the parked vehicle)). That is, because the three dimensional image included in the digital map for the first location 102: (1) is intended to include information about static aspects of the first location 102 and (2) is produced by the neural network from the image data 210, the neural network can produce the three dimensional image included in the digital map for the first location 102 in a manner that excludes a dynamic object (e.g., the third object 110 (e.g., the parked vehicle)) included in the image data 210.

In a third application, the neural network can account for having a spatial deviation between an ostensible positon of an object in the image data 210 and an actual position of the object. The digital map for the first location 102 can include a three dimensional image of the first location 102 (illustrated in FIG. 1). The image data 210 can include a representation of the object (e.g., the fourth object 112 (e.g., the traffic light)) at the ostensible position. A first spatial deviation can exist between the ostensible position and the actual position of the object (e.g., the fourth object 112 (e.g., the traffic light)). For example, due to a degree of accuracy (e.g., inherent uncertainty) of a sensor or a system that produced an image included in the image data 210, a position of a representation of the object (e.g., the fourth object 112 (e.g., the traffic light)) in the image data 210 can be different from the actual position. The neural network module 216 can further include instructions that function to control the processor 202 to determine an existence of the first spatial deviation. The neural network module 216 can further include instructions that function to control the processor 202 to cause, in response to a determination of the existence of the first spatial deviation, the object (e.g., the fourth object 112 (e.g., the traffic light)) to appear in the three dimensional image at a calculated position. A second spatial deviation may exist between the calculated position and the actual position, but the second spatial deviation can be less than the first spatial deviation.

In a fourth application, the neural network can use a Bayesian filter to predict a state of an item of information that appears in the digital map for the first location 102. The digital map for the first location 102 can include a three dimensional image of the first location 102 (illustrated in FIG. 1). The neural network can include a Bayesian filter that performs, in iterations of a cycle, a prediction operation and a correction operation. The prediction operation can produce, at a first time, a prediction of the state, at a second time, of the item of information that appears in the three dimensional image.

In a first example, the item of information can be an existence, at a specific time, of a vehicle being parked in a specific lane. The prediction operation can produce, at 4:55 pm, the prediction that there will not be an existence, at 5:05 pm, of a vehicle (e.g., the third object 110 (e.g., the parked vehicle)) parked in the specific lane.

In a second example, the item of information can be a state, at a specific time, of a specific traffic light. The prediction operation can produce, at 4:55 pm, the prediction that the state, at 5:05 pm, of the specific traffic light (e.g., the fourth object 112 (e.g., the traffic light)) will be green.

The neural network module 216 can further include instructions that function to control the processor 202 to cause the item of information to appear in the three dimensional image in accordance with the prediction of the state.

The processor 202 can be further configured to receive information about a reality of the state, at the second time, of the item of information. In the first implementation, in which the system 200 is disposed in a vehicle, the processor 202 can be configured to receive the information about the reality of the state, at the second time, of the item of information from a sensor (e.g., an image sensor or a camera) on the vehicle. In the second implementation, in which the system 200 is disposed, for example, in the web map server 114 (illustrated in FIG. 1), the processor 202 can be configured to receive the information about the reality of the state, at the second time, of the item of information from a vehicle at the first location 102, an item of infrastructure (e.g., the first object 106 (e.g., the street sign), the fourth object 112 (e.g., the traffic light), or the like) at the first location 102, or both.

In the first example, the information about the reality of the existence, at 5:05 pm, of a vehicle being parked in the specific lane can be that there is a vehicle (e.g., the third object 110 (e.g., the parked vehicle)) parked in the specific lane.

In the second example, the information about the reality of the state, at 5:05 pm, of the specific traffic light can be that the specific traffic light (e.g., the fourth object 112 (e.g., the traffic light)) is green.

The correction operation can act, based on a difference between the reality of the state and the prediction of the state, to modify a performance of the prediction operation.

In a fifth application, the neural network can be responsive to a query to receive information about a viewpoint of a presentation of the digital map for the first location 102. The digital map for the first location 102 can include a three dimensional image of the first location 102 (illustrated in FIG. 1). The processor 202 can be further configured to receive, from the automotive navigation system, the query to receive the information about the viewpoint of the presentation of the digital map for the first location 102. The memory 206 can further store a determination module 228. For example, the determination module 228 can include instructions that function to control the processor 202 to determine, in response to a receipt of the query, the viewpoint of the three dimensional image. For example, the viewpoint of the presentation of the first location 102 illustrated in FIG. 1 is facing north. The communications module 218 can further include instructions that function to control the processor 202 to transmit the information about the viewpoint to the automotive navigation system.

In a sixth application, the neural network can be responsive to a query to receive a presentation of the digital map for the first location 102 from a viewpoint. The digital map for the first location 102 can include a three dimensional image of the first location 102 (illustrated in FIG. 1). The processor 202 can be further configured to receive, from the automotive navigation system, the query to receive the presentation of the digital map for the first location 102. The query can specify the viewpoint for the presentation. For example, the query can specify that the viewpoint for the presentation of the digital map for the first location 102 be facing east. The neural network module 216 can further include instructions that function to control the processor 202 to cause, in response to a receipt of the viewpoint, the three dimensional image to appear to be from the viewpoint.

In a seventh application, the neural network can determine if new image data for the first location 102 should be added to the set of image data 210 so that the digital map for the first location 102 is updated. The digital map for the first location 102 can include a three dimensional image of the first location 102 (illustrated in FIG. 1). The processor 202 can be further configured to receive the new image data for the first location 102. The neural network module 216 can further include instructions that function to control the processor 202 to execute, in response to a receipt of the new image data for the first location 102, the neural network to determine a relationship between information in the new image data for the first location 102 and a criterion that justifies an update of the digital map for the first location 102.

For example, the criterion can be based on: (1) an existence of an object in the new image data for the first location 102 that lacks an existence in the digital map for the first location 102, (2) a lack of an existence of an object in the new image data for the first location 102 that has an existence in the digital map for the first location 102, (3) a magnitude of a change to an object represented in the new image data for the first location 102 as compared with the digital map for the first location 102 being greater than a threshold, (4) a count of changes in the new image data for the first location 102 as compared with the digital map for the first location 102 being greater than a threshold, (5) a difference between a time of production of the new image data for the first location 102 and a time of production of the set of image data 210 being greater than a threshold, or (6) the like.

The neural network module 216 can further include instructions that function to control the processor 202 to add, in response to a determination that the relationship between the information in the new image data for the first location 102 and the criterion does justify the update of the digital map for the first location 102, the new image data for the first location 102 to the set of image data 210 included in the first file 208.

Additionally, the initiation module 214 can further include instructions that function to control the processor 202 to receive, in response to the new image data for the first location 102 having been added to the set of image data 210, the image data 210 (with the new image data for the first location 102) for the neural network as a training input for a training operation of the neural network. The neural network module 216 can further include instructions that function to control the processor 202 to cause one or more adjustments to one or more values of one or more weights of the weights of the set of node data 212 so that a loss function for the training operation of the neural network is at a minimum value. The neural network module 216 can further include instructions that function to control the processor 202 to cause the values of the weights of the set of node data 212 included in the first file 208 to account for the one or more adjustments to the one or more values of the one or more weights.

Figure 5:
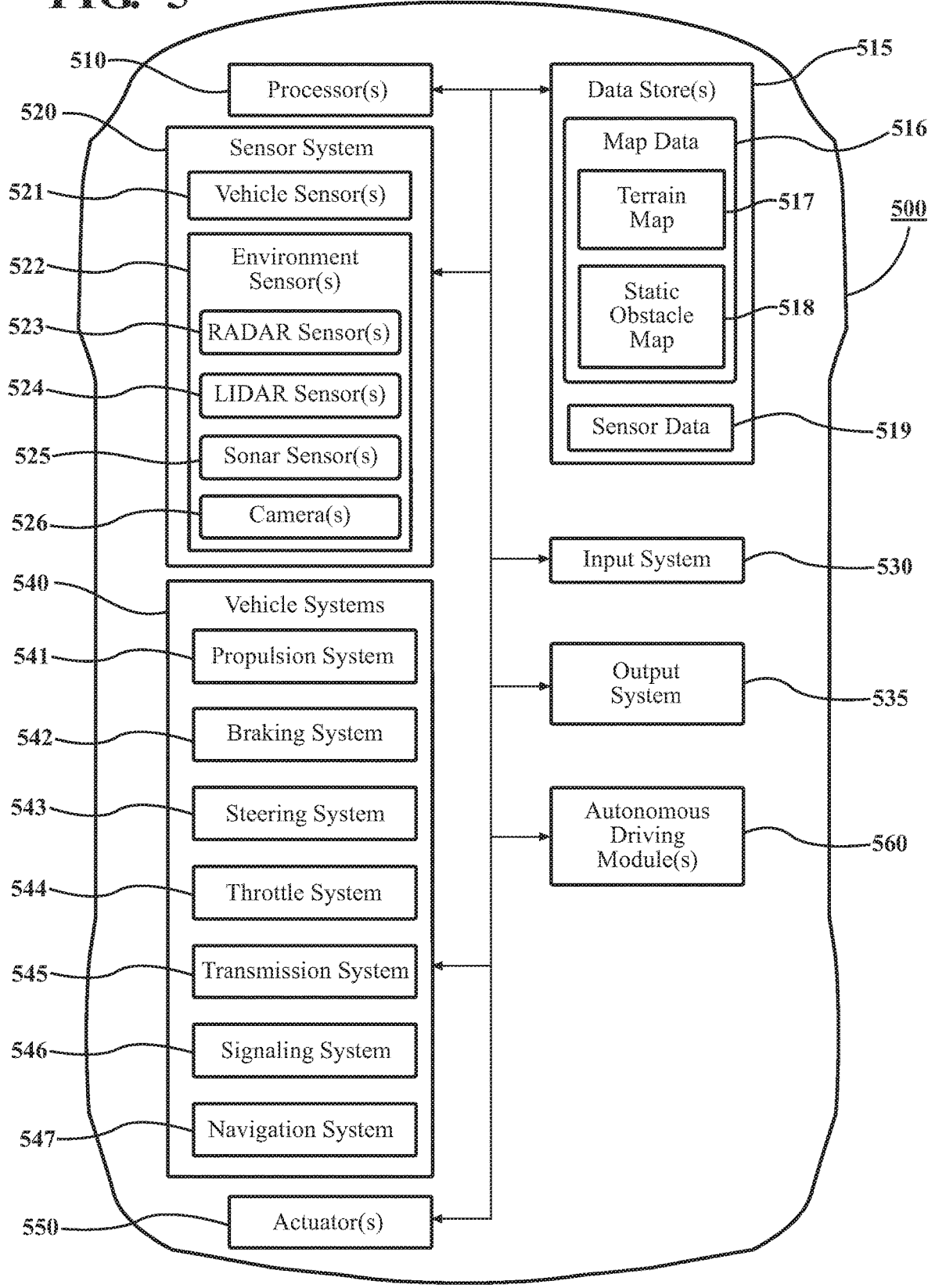
FIG. 5 is a block diagram that illustrates an example of elements disposed on a vehicle, according to the disclosed technologies.

FIG. 5 is a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an autonomous vehicle. As used herein, "autonomous vehicle" can refer to a vehicle that operates in an autonomous mode. As used herein, "autonomous mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-autonomous operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, and one or more autonomous driving modules 560.

In one or more arrangements, the one or more processors 510 can be a main processor of the vehicle 500. For example, the one or more processors 510 can be an electronic control unit (ECU). For example, functions and/or operations of the processor 202 (illustrated in FIG. 2) can be realized by the one or more processors 510.

The one or more data stores 515 can store, for example, one or more types of data. For example, functions and/or operations of the data store 204 and/or the memory 206 (illustrated in FIG. 2) can be realized by the one or more data stores 515. The one or more data store 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the map data 516 can include the first file 208, the second file 222, or both (illustrated in FIG. 2).

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more LIDAR sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangement, the one or more environment sensors 522 can include one or more radar sensors 523, one or more LIDAR sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in digital map.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more autonomous driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more autonomous driving modules 560 can be operatively connected to communicate with the various vehicle systems 540 and/or individual components thereof. For example, the one or more processors 510 and/or the one or more autonomous driving modules 560 can be in communication to send and/or receive information from the various vehicle systems 540 to control the movement, speed, maneuvering, heading, direction, etc. of the vehicle 500. The one or more processors 510 and/or the one or more autonomous driving modules 560 may control some or all of these vehicle systems 540 and, thus, may be partially or fully autonomous.

The one or more processors 510 and/or the one or more autonomous driving modules 560 may be operable to control the navigation and/or maneuvering of the vehicle 500 by controlling one or more of the vehicle systems 540 and/or components thereof. For example, when operating in an autonomous mode, the one or more processors 510 and/or the one or more autonomous driving modules 560 can control the direction and/or speed of the vehicle 500. The one or more processors 510 and/or the one or more autonomous driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more autonomous driving modules 560. The one or more autonomous driving modules 560 can be configured to receive data from the sensor system 520 and/or any other type of system capable of capturing information relating to the vehicle 500 and/or the external environment of the vehicle 500. In one or more arrangements, the one or more autonomous driving modules 560 can use such data to generate one or more driving scene models. The one or more autonomous driving modules 560 can determine position and velocity of the vehicle 500. The one or more autonomous driving modules 560 can determine the location of obstacles, obstacles, or other environmental features including traffic signs, trees, shrubs, neighboring vehicles, pedestrians, etc. For example, functions and/or operations of the control module 220 (illustrated in FIG. 2) can be realized by the one or more autonomous driving modules 560.

The one or more autonomous driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more autonomous driving modules 560 can be configured to determine one or more travel paths, current autonomous driving maneuvers for the vehicle 500, future autonomous driving maneuvers and/or modifications to current autonomous driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more autonomous driving modules 560 can be configured to implement determined driving maneuvers. The one or more autonomous driving modules 560 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more autonomous driving modules 560.

Figure 6A:
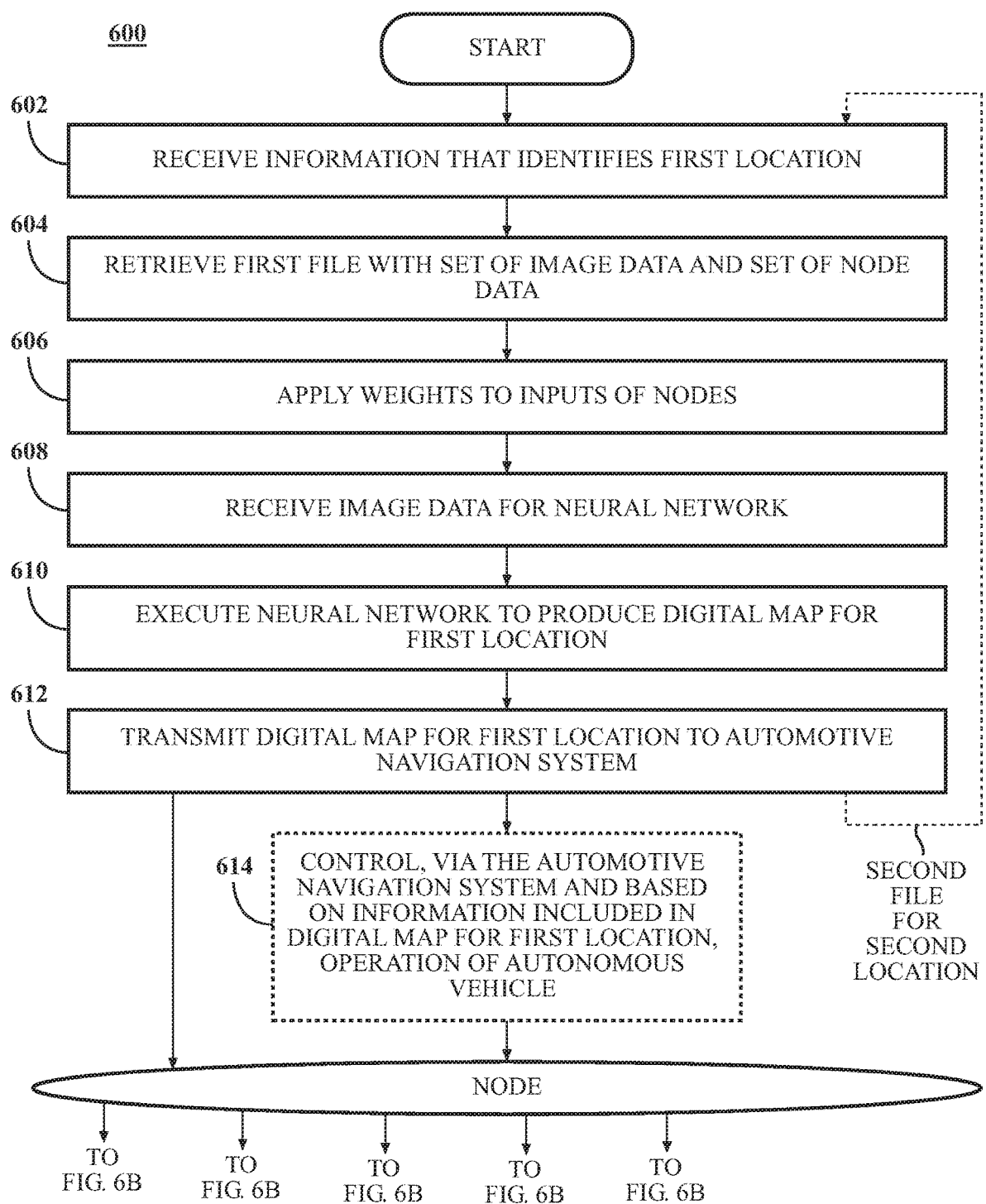
FIGS. 6A to 6C are a flow diagram that illustrates an example of a method that is associated with producing the digital map for the location, according to the disclosed technologies.
Figure 6B:
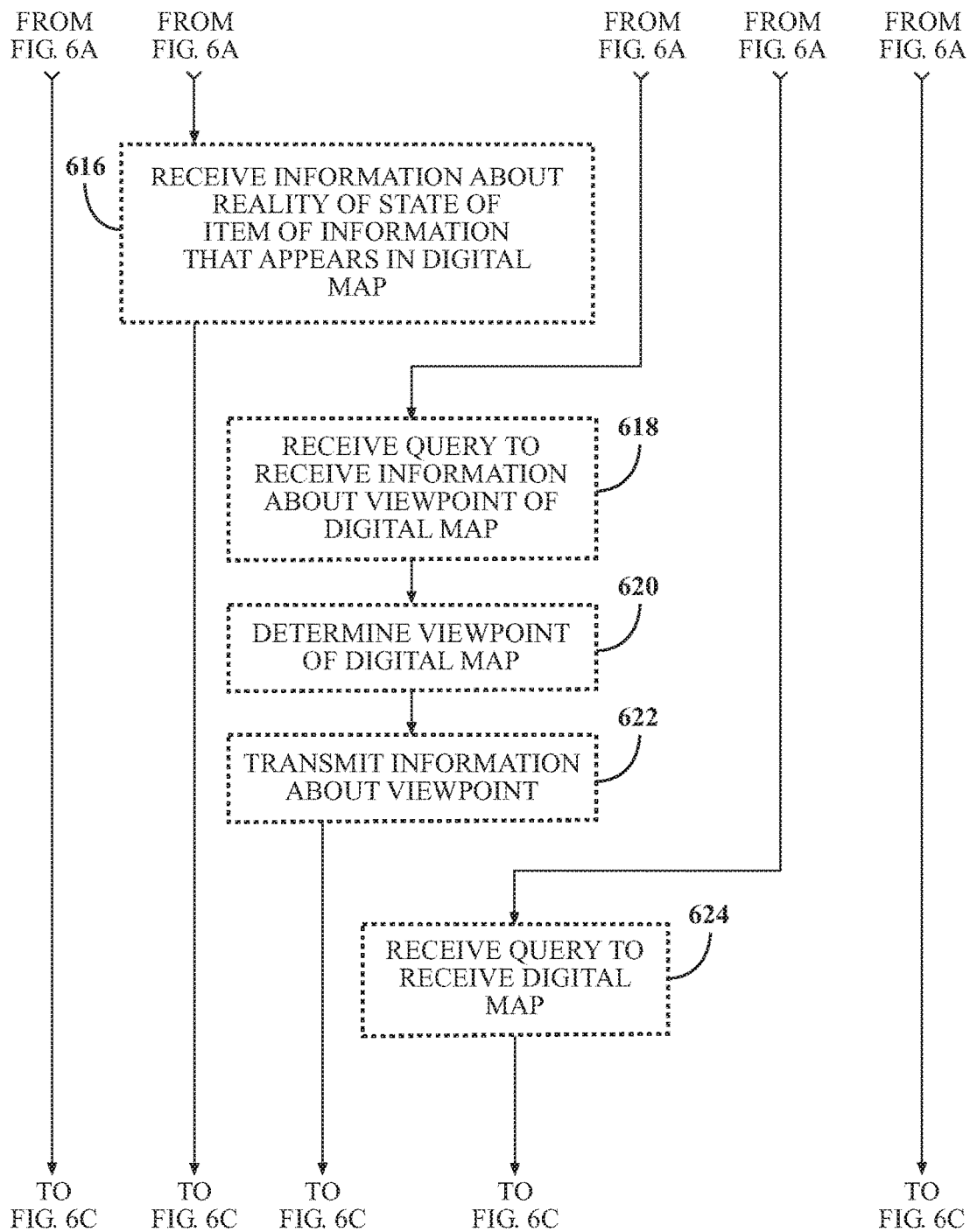
Figure 6C:
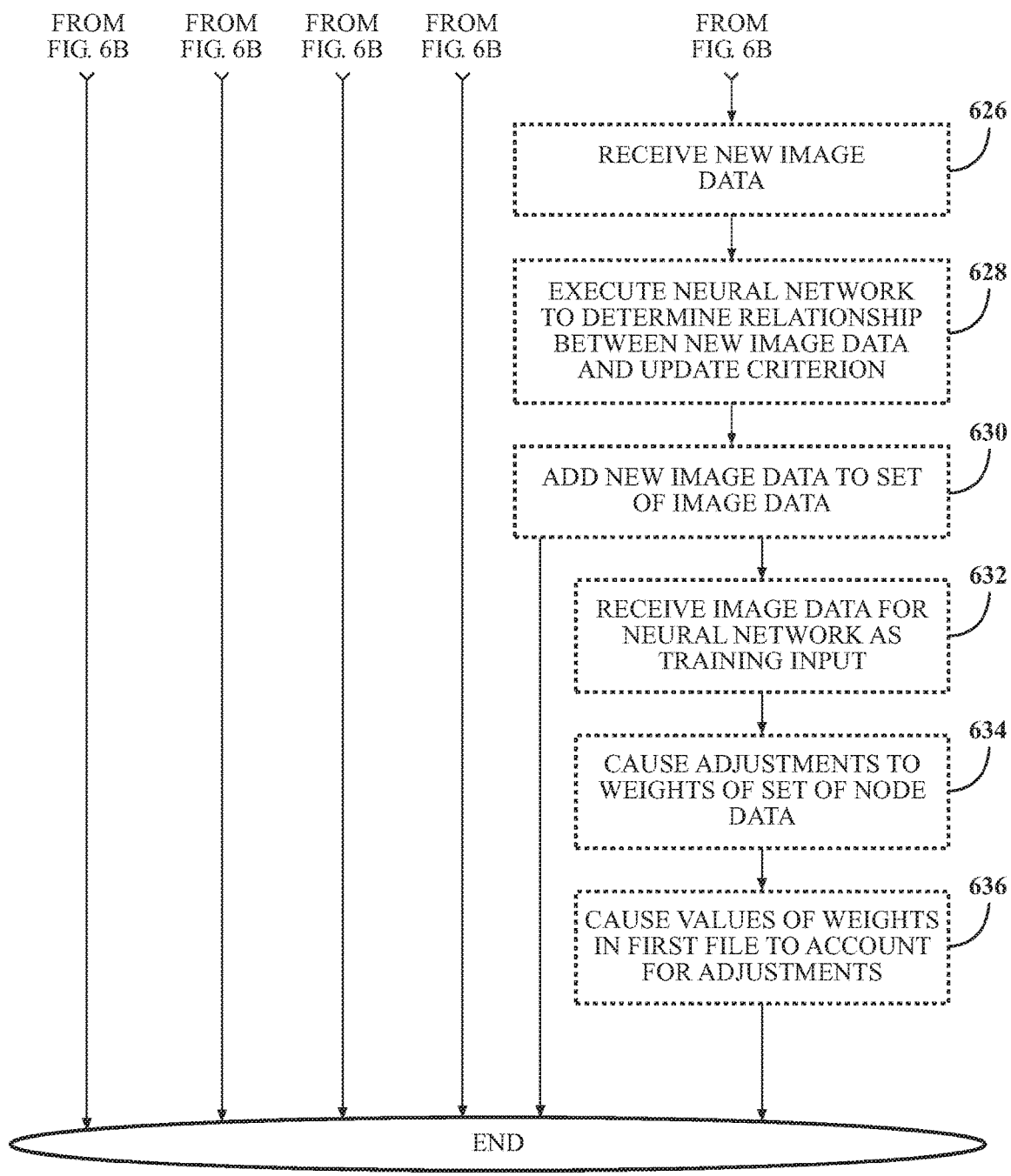

FIGS. 6A to 6C are a flow diagram that illustrates an example of a method 600 that is associated with producing the digital map for the location, according to the disclosed technologies. The method 600 is described from the perspective of the system 200 illustrated in FIG. 2. Although the method 600 is described in combination with the system 200, one of skill in the art understands, in light of the description herein, that the method 600 is not limited to being implemented by the system 200. Rather, the system 200 is an example of a system that may be used to implement the method 600.

In FIG. 6A, in the method 600, at an operation 602, the processor 202 can receive information that identifies the first location 102. In the first implementation, the processor 202 can be disposed in a vehicle. In this implementation, the processor 202 can be configured to receive the information that identifies the first location 102 from a first system that is separate from the vehicle. The first system that is separate from the vehicle can be, for example, a global navigation satellite system (GNNS). In the second implementation, the processor 202 can be disposed in a second system that is separate from the vehicle. The second system that is separate from the vehicle can be, for example, the web map server 114 (illustrated in FIG. 1). In this implementation, the processor 202 can be configured to receive the information that identifies the first location 102 from the vehicle.

At an operation 604, the processor 202 can retrieve, in response to a receipt of the information that identifies the first location 102, the first file 208. The first file 208 can be for the first location 102. The first file 208 can include the set of image data 210 and the set of node data 212. For example, the set of image data 210 can include point cloud information (e.g. produced by a light detection and ranging (LIDAR) system). For example, the set of image data 210 can include pixel information from one or more images (e.g., produced by one or more image sensors or cameras). For example, the one or more images can be one or more two dimensional images. The set of node data 212 can include information that identifies nodes in a neural network, information that identifies inputs of the nodes, and values of weights to be applied to the inputs.

At an operation 606, the processor 202 can apply, in response to a retrieval of the first file 208, the weights to the inputs of the nodes.

At an operation 608, the processor 202 can receive, in response to the retrieval of the first file 208, the image data 210 for the neural network.

At an operation 610, the processor 202 can execute, in response to an application of the weights and a receipt of the image data 210, the neural network to produce the digital map for the first location 102. For example, the digital map for the first location 102 can include a web map. For example, the digital map for the first location 102 can include a high definition map. For example, the digital map for the first location 102 can include a three dimensional image of the first location 102.

At an operation 612, the processor 202 can transmit the digital map for the first location 102 to an automotive navigation system. In the first implementation, in which the processor 202 is disposed in a vehicle, the processor 202 can transmit, within the vehicle, the digital map for the first location 102 to the automotive navigation system of the vehicle. In the second implementation, in which the processor 202 is disposed, for example, in the web map server 114 (illustrated in FIG. 1), the processor 202 can transmit, to a vehicle, the digital map for the first location 102 to the automotive navigation system of the vehicle.

In a variation of the first implementation or the second implementation, the vehicle can be an autonomous vehicle. In this variation, in the method 600, at an operation 614, the processor 202 can control, via the automotive navigation system and based on information included in the digital map for the first location 102, an operation of the autonomous vehicle.

Additionally, in the method 600, the processor 202 can repeat the operation 602, the operation 604, the operation 606, the operation 608, the operation 610, and the operation 612 for the second file 222 for the second location 104. The second file 222 can include the set of image data 224 and the set of node data 226. The set of node data 226 can include the information that identifies the nodes in the neural network, the information that identifies the inputs of the nodes, and the values of the weights to be applied to the inputs. At least one value of at least one weight of the weights of the set of node data 228 for the second location 104 can be different from at least one value of at least one weight of the weights of the set of node data 212 for the first location 102.

In the first application, the neural network can account for having at least a portion of a first object be occluded by at least a portion of a second object in the image data 210. The digital map for the first location 102 can include a three dimensional image of the first location 102 (illustrated in FIG. 1). The three dimensional image of the first location 102 can be from a viewpoint. The image data 210 can include a representation of the first object (e.g., the first object 106 (e.g., the street sign)) and a representation of the second object (e.g., the second object 108 (e.g., the tree)). The neural network can be configured to determine an existence, from the viewpoint, of an occlusion of at least a portion of the first object (e.g., the first object 106 (e.g., the street sign)) by at least a portion of the second object (e.g., the second object 108 (e.g., the tree)). The neural network can be configured to cause, in response to a determination of the existence of the occlusion, the at least the portion of the first object (e.g., the first object 106 (e.g., the street sign)) to appear in the three dimensional image free from the occlusion by the at least the portion of the second object (e.g., the second object 108 (e.g., the tree)).

In the second application, the neural network can account for having a dynamic object in the image data 210. The digital map for the first location 102 can include a three dimensional image of the first location 102 (illustrated in FIG. 1). The image data 210 can include a representation of an object (e.g., the third object 110 (e.g., the parked vehicle)). The neural network can be configured to determine that the object (e.g., the third object 110 (e.g., the parked vehicle)) is a dynamic object. The neural network can be configured to cause, in response to a determination that the object (e.g., the third object 110 (e.g., the parked vehicle)) is a dynamic object, the three dimensional image to exclude the object (e.g., the third object 110 (e.g., the parked vehicle)).

In the third application, the neural network can account for having a spatial deviation between an ostensible positon of an object in the image data 210 and an actual position of the object. The digital map for the first location 102 can include a three dimensional image of the first location 102 (illustrated in FIG. 1). The image data 210 can include a representation of the object (e.g., the fourth object 112 (e.g., the traffic light)) at the ostensible position. A first spatial deviation can exist between the ostensible position and the actual position of the object (e.g., the fourth object 112 (e.g., the traffic light)). The neural network can be configured to determine an existence of the first spatial deviation. The neural network can be configured to cause, in response to a determination of the existence of the first spatial deviation, the object (e.g., the fourth object 112 (e.g., the traffic light)) to appear in the three dimensional image at a calculated position. A second spatial deviation may exist between the calculated position and the actual position, but the second spatial deviation can be less than the first spatial deviation.

In the fourth application, the neural network can use a Bayesian filter to predict a state of an item of information that appears in the digital map for the first location 102. The digital map for the first location 102 can include a three dimensional image of the first location 102 (illustrated in FIG. 1). The neural network can include a Bayesian filter that performs, in iterations of a cycle, a prediction operation and a correction operation. The prediction operation can produce, at a first time, a prediction of the state, at a second time, of the item of information that appears in the three dimensional image. The neural network can be configured to cause the item of information to appear in the three dimensional image in accordance with the prediction of the state. In FIG. 6B, in the method 600, at an operation 616, the processor 202 can receive information about a reality of the state, at the second time, of the item of information. In the first implementation, in which the processor 202 is disposed in a vehicle, the processor 202 can receive the information about the reality of the state, at the second time, of the item of information from a sensor (e.g., an image sensor or a camera) on the vehicle. In the second implementation, in which the processor 202 is disposed, for example, in the web map server 114 (illustrated in FIG. 1), the processor 202 can receive the information about the reality of the state, at the second time, of the item of information from a vehicle at the first location 102, an item of infrastructure (e.g., the first object 106 (e.g., the street sign), the fourth object 112 (e.g., the traffic light), or the like) at the first location 102, or both. The correction operation can act, based on a difference between the reality of the state and the prediction of the state, to modify a performance of the prediction operation.

In the fifth application, the neural network can be responsive to a query to receive information about a viewpoint of a presentation of the digital map for the first location 102. The digital map for the first location 102 can include a three dimensional image of the first location 102 (illustrated in FIG. 1). In the method 600, at an operation 618, the processor 202 can receive, from the automotive navigation system, the query to receive the information about the viewpoint of the presentation of the digital map for the first location 102. At an operation 620, the processor 202 can determine, in response to a receipt of the query, the viewpoint of the three dimensional image. For example, the viewpoint of the presentation of the first location 102 illustrated in FIG. 1 is facing north. At an operation 622, the processor 202 can transmit the information about the viewpoint to the automotive navigation system.

In the sixth application, the neural network can be responsive to a query to receive a presentation of the digital map for the first location 102 from a viewpoint. The digital map for the first location 102 can include a three dimensional image of the first location 102 (illustrated in FIG. 1). In the method 600, at an operation 624, the processor 202 can receive, from the automotive navigation system, the query to receive the presentation of the digital map for the first location 102. The query can specify the viewpoint for the presentation. For example, the query can specify that the viewpoint for the presentation of the digital map for the first location be facing east. The neural network can be configured to cause, in response to a receipt of the viewpoint, the three dimensional image to appear to be from the viewpoint.

In the seventh application, the neural network can determine if new image data for the first location 102 should be added to the set of image data 210 so that the digital map for the first location 102 is updated. The digital map for the first location 102 can include a three dimensional image of the first location 102 (illustrated in FIG. 1). In FIG. 6C, in the method 600, at an operation 626, the processor 202 can receive the new image data for the first location 102. At an operation 628, the processor 202 can execute, in response to a receipt of the new image data for the first location 102, the neural network to determine a relationship between information in the new image data for the first location 102 and a criterion that justifies an update of the digital map for the first location 102. At an operation 630, the processor 202 can add, in response to a determination that the relationship between the information in the new image data for the first location 102 and the criterion does justify the update of the digital map for the first location 102, the new image data for the first location 102 to the set of image data 210 included in the first file 208.

Additionally, in the method 600, at an operation 632, the processor 202 can receive, in response to the new image data for the first location 102 having been added to the set of image data 210, the image data 210 (with the new image data for the first location 102) for the neural network as a training input for a training operation of the neural network. At an operation 634, the processor 202 can cause one or more adjustments to one or more values of one or more weights of the weights of the set of node data 212 so that a loss function for the training operation of the neural network is at a minimum value. At an operation 636, the processor 202 can cause the values of the weights of the set of node data 212 included in the first file 208 to account for the one or more adjustments to the one or more values of the one or more weights.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, 4, 5, 6A, 6B, and 6C, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of ... or ... " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A system for producing a digital map for a location, the system comprising:
   one or more processors configured to receive information that identifies a first location and a second location;
   a data store communicably coupled to the one or more processors and storing a first file and a second file, wherein:
   the first file is for the first location,
   the second file is for the second location,
   the first file includes a set of image data and a set of node data,
   the second file includes another set of image data and another set of node data,
   the set of node data includes information that identifies nodes in a neural network, information that identifies inputs of the nodes, and values of weights to be applied to the inputs, and
   the another set of node data includes the information that identifies the nodes in the neural network, the information that identifies the inputs of the nodes, and other values of weights to be applied to the inputs, a value of a weight of a node, in the other set of node data for the second location, being different from a value of the weight of the node in the set of node data for the first location; and
   a memory communicably coupled to the one or more processors and storing:
   an initiation module including instructions that when executed by the one or more processors cause, in response to a retrieval of the first file, the one or more processors to apply the values of the weights to the inputs of the nodes and to receive image data, of the set of image data, for the neural network;
   a neural network module including instructions that when executed by the one or more processors cause the one or more processors to execute, in response to an application of the values of the weights and a receipt of the image data, of the set of image data the neural network to produce the digital map for the first location; and
   a communications module including instructions that when executed by the one or more processors cause the one or more processors to transmit the digital map for the first location to an automotive navigation system.

2. The system of claim 1, wherein the system is disposed in a vehicle.

3. The system of claim 1, wherein the memory further stores a control module including instructions that when executed by the one or more processors cause the one or more processors to control, via the automotive navigation system and based on information included in the digital map for the first location, an operation of an autonomous vehicle.

4. The system of claim 1, wherein:
   the digital map for the first location comprises a three dimensional image of the first location,
   the three dimensional image of the first location is from a viewpoint,
   the image data, of the set of image data, include a representation of a first object and a representation of a second object, and
   the neural network module further includes instructions that when executed by the one or more processors cause the one or more processors to:
   determine an existence, from the viewpoint, of an occlusion of at least a portion of the first object by at least a portion of the second object, and
   cause, in response to a determination of the existence of the occlusion, the at least the portion of the first object to appear in the three dimensional image free from the occlusion by the at least the portion of the second object.

5. The system of claim 1, wherein:
   the digital map for the first location comprises a three dimensional image of the first location,
   the image data, of the set of image data, include a representation of an object, and
   the neural network module further includes instructions that when executed by the one or more processors cause the one or more processors to:
   determine that the object is a dynamic object, and
   cause, in response to a determination that the object is the dynamic object, the three dimensional image to exclude the object.

6. The system of claim 1, wherein:
   the digital map for the first location comprises a three dimensional image of the first location,
   the image data, of the set of image data, include a representation of an object at an ostensible position,
   a first spatial deviation exists between the ostensible position and an actual position of the object,
   the neural network module further includes instructions that when executed by the one or more processors cause the one or more processors to:
   determine an existence of the first spatial deviation, and
   cause, in response to a determination of the existence of the first spatial deviation, the object to appear in the three dimensional image at a calculated position,
   a second spatial deviation exists between the calculated position and the actual position, and
   the second spatial deviation is less than the first spatial deviation.

7. The system of claim 1, wherein:
   the digital map for the first location comprises a three dimensional image of the first location,
   the neural network includes a Bayesian filter that performs, in iterations of a cycle, a prediction operation and a correction operation,
   the prediction operation produces, at a first time, a prediction of a state, at a second time, of an item of information that appears in the three dimensional image,
   the neural network module further includes instructions that when executed by the one or more processors cause the one or more processors to cause the item of information to appear in the three dimensional image in accordance with the prediction of the state, the one or more processors are further configured to receive information about a reality of the state, at the second time, of the item of information, and the correction operation acts, based on a difference between the reality of the state and the prediction of the state, to modify a performance of the prediction operation.

8. The system of claim 1, wherein:

the digital map for the first location comprises a three dimensional image of the first location, the one or more processors are further configured to receive, from the automotive navigation system, a query to receive information about a viewpoint of a presentation of the digital map for the first location, the memory further stores a determination module including instructions that when executed by the one or more processors cause the one or more processors to determine, in response to a receipt of the query, the viewpoint of the three dimensional image, and the communications module further includes instructions that when executed by the one or more processors cause the one or more processors to transmit the information about the viewpoint to the automotive navigation system.

9. The system of claim 1, wherein:

the digital map for the first location comprises a three dimensional image of the first location, the one or more processors are further configured to receive, from the automotive navigation system, a query to receive a presentation of the digital map for the first location, the query specifies a viewpoint for the presentation, and the neural network module further includes instructions that when executed by the one or more processors cause the one or more processors to cause, in response to a receipt of the viewpoint, the three dimensional image to appear to be from the viewpoint.

10. The system of claim 1, wherein:

the digital map for the first location comprises a three dimensional image of the first location, the one or more processors are further configured to receive new image data for the first location, and the neural network module further includes instructions that when executed by the one or more processors cause the one or more processors to:

execute, in response to a receipt of the new image data for the first location, the neural network to determine a relationship between information in the new image data for the first location and a criterion that justifies an update of the digital map for the first location, and add, in response to a determination that the relationship between the information in the new image data for the first location and the criterion does justify the update of the digital map for the first location, the new image data for the first location to the set of image data included in the first file.

11. The system of claim 10, wherein:

the initiation module further includes instructions that when executed by the one or more processors cause, in response to the new image data for the first location having been added to the set of image data, the one or more processors to receive the image data, of the set of image data, for the neural network as a training input for a training operation of the neural network, and the neural network module further includes instructions that when executed by the one or more processors cause the one or more processors to cause:

at least one adjustment to at least one value of at least one weight of the weights of the set of node data so that a loss function for the training operation of the neural network is at a minimum value, and the values of the weights of the set of node data included in the first file to account for the at least one adjustment to the at least one value of the at least one weight.

12. A non-transitory computer-readable medium for producing a digital map for a location, the non-transitory computer-readable medium including instructions that when executed by one or more processors cause the one or more processors to:

receive information that identifies a first location and a second location;

store a first file and a second file, wherein:

the first file is for the first location, the second file is for the second location, the first file includes a set of image data and a set of node data, the second file includes another set of image data and another set of node data, the set of node data includes information that identifies nodes in a neural network, information that identifies inputs of the nodes, and values of weights to be applied to the inputs, and the another set of node data includes the information that identifies the nodes in the neural network, the information that identifies the inputs of the nodes, and other values of weights to be applied to the inputs, a value of a weight of a node, in the other set of node data for the second location, being different from a value of the weight of the node in the set of node data for the first location; and retrieve, in response to a receipt of the information that identifies the first location, the first file;

apply, in response to a retrieval of the first file, the values of the weights to the inputs of the nodes;

receive, in response to the retrieval of the first file, image data, of the set of image data, for the neural network;

execute, in response to an application of the values of the weights and a receipt of the image data, of the set of image data, the neural network to produce the digital map for the first location; and transmit the digital map for the first location to an automotive navigation system.

13. A method for producing a digital map for a location, the method comprising:

receiving, by a processor, information that identifies a first location and a second location;

storing, by the processor, a first file and a second file, wherein:

the first file is for the first location, the second file is for the second location, the first file includes a set of image data and a set of node data, the second file includes another set of image data and another set of node data, the set of node data includes information that identifies nodes in a neural network, information that identifies inputs of the nodes, and values of weights to be applied to the inputs, and the another set of node data includes the information that identifies the nodes in the neural network, the information that identifies the inputs of the nodes, and other values of weights to be applied to the inputs, a value of a weight of a node, in the other set of node data for the second location, being different from a value of the weight of the node in the set of node data for the first location;

retrieving, by the processor and in response to a receipt of the information that identifies the first location, the first file;

applying, by the processor and in response to a retrieval of the first file, the values of the weights to the inputs of the nodes;

receiving, by the processor and in response to the retrieval of the first file, image data, of the set of image data for the neural network;

executing, by the processor and in response to an application of the values of the weights and a receipt of the image data, of the set of image data the neural network to produce the digital map for the first location; and transmitting, by the processor, the digital map for the first location to an automotive navigation system.

14. The method of claim 13, wherein the digital map for the first location comprises a web map.

15. The method of claim 13, wherein the digital map for the first location comprises a high definition map.

16. The method of claim 13, wherein the digital map for the first location comprises a three dimensional image of the first location.

17. The method of claim 13, wherein the set of image data comprises point cloud information.

18. The method of claim 13, wherein the set of image data comprises pixel information from at least one image.

19. The method of claim 18, wherein the at least one image comprises at least one two dimensional image.

20. The system of claim 1, wherein the value of the weight of the node, in the set of node data for the first location, is a function of a type of device that produced the image data of the set of image data.

21. A system, comprising:
a processor; and
a memory storing a module including instructions that cause the processor, in response to a retrieval of:
a first file, to:
apply first weight values to a neural network,
receive first location image data into the neural network,
produce a first location map, and
communicate the first location map to an automotive navigation system; and
a second file, to:
apply second weight values to the neural network,
receive second location image data into the neural network,
produce a second location map; and
communicate the second location map to the automotive navigation system.

* * * * *

UNITED STATES PATENT AND TRADEMARK OFFICE
CERTIFICATE OF CORRECTION

PATENT NO. : 11,891,094 B2
APPLICATION NO. : 16/897830
DATED : February 6, 2024
INVENTOR(S) : Vitor Campagnolo Guizilini et al.

It is certified that error appears in the above-identified patent and that said Letters Patent is hereby corrected as shown below:

In the Claims

Claim 1, Column 21, Line 56: delete "the set of image data the neural network" and insert --the set of image data, the neural network--.

Claim 13, Column 25, Line 11: delete "the set of image data for" and insert --the set of image data, for--.

Claim 13, Column 25, Line 15: delete "the set of image data the neural network" and insert --the set of image data, the neural network--.

Signed and Sealed this
Nineteenth Day of March, 2024

Katherine Kelly Vidal
*Director of the United States Patent and Trademark Office*